US012682592B2

(12) United States Patent
Park et al.

(10) Patent No.: US 12,682,592 B2
(45) Date of Patent: Jul. 14, 2026

(54) APPARATUS AND METHOD FOR IMAGE ACQUISITION BASED ON ENHANCEMENT OF MAXIMUM CONTRAST RATIO AND STORAGE MEDIUM STORING INSTRUCTIONS TO PERFORM METHOD FOR IMAGE ACQUISITION

(71) Applicant: UNIST(ULSAN NATIONAL INSTITUTE OF SCIENCE AND TECHNOLOGY), Ulsan (KR)

(72) Inventors: Chung Hun Park, Ulsan (KR); Taeseong Woo, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 329 days.

(21) Appl. No.: 18/630,190

(22) Filed: Apr. 9, 2024

(65) Prior Publication Data

US 2024/0265666 A1 Aug. 8, 2024

Related U.S. Application Data

(63) Continuation of application No. PCT/KR2022/001133, filed on Jan. 21, 2022.

(30) Foreign Application Priority Data

Oct. 14, 2021 (KR) ........................ 10-2021-0136698

(51) Int. Cl.
*G06V 10/25* (2022.01)
*G06V 10/141* (2022.01)
(Continued)

(52) U.S. Cl.
CPC ............ *G06V 10/25* (2022.01); *G06V 10/141* (2022.01); *G06V 10/56* (2022.01); *G06V 10/60* (2022.01)

(58) Field of Classification Search
CPC ...... G06V 10/25; G06V 10/141; G06V 10/56; G06V 10/60; H04N 9/64; H04N 23/12;
(Continued)

(56) References Cited

U.S. PATENT DOCUMENTS 7,599,076 B2 * 10/2009 Saito ........................ H01J 37/28
356/630
9,291,450 B2 * 3/2016 Takahashi .............. G06V 20/66
(Continued)

FOREIGN PATENT DOCUMENTS

KR 20100132189 A 12/2010
KR 101450120 B1 10/2014
(Continued)

OTHER PUBLICATIONS

Manish Saxena, Gangadhar Eluru, and Sai Siva Gorthi, "Structured illumination microscopy," Adv. Opt. Photon. 7, 241-275 (2015) (Year: 2015).*
(Continued)

*Primary Examiner* — Wesley J Tucker
(74) *Attorney, Agent, or Firm* — NKL LAW; Jae Youn Kim

(57) ABSTRACT

There is provided an image acquisition apparatus. The apparatus comprises a memory configured to store instructions; and a processor configured to: obtain distribution information representing distribution of an original visual information of at least one region of interest including an object under observation; determine an illumination pattern of a light source based on the distribution information so that a range of the original visual information of at least one region of interest including the object under observation falls within a pre-determined range; control the light source to illuminate the determined illumination pattern on the object under observation; obtain images of the object under
(Continued)

observation illuminated by the light source with the determined illumination pattern; and estimate the original visual information for at least one region of interest including the object under observation by tracking back information on the obtained images based on the information on the illumination pattern.

11 Claims, 5 Drawing Sheets

(51) Int. Cl.
 *G06V 10/56* (2022.01)
 *G06V 10/60* (2022.01)

(58) Field of Classification Search
 CPC ........ H04N 23/70; H04N 23/84; H04N 23/73; H04N 23/71
 See application file for complete search history.

(56) References Cited

U.S. PATENT DOCUMENTS

| | | | | |
|---|---|---|---|---|
| 10,539,772 | B2 * | 1/2020 | Keller | G02B 21/10 |
| 11,144,781 | B2 * | 10/2021 | Inoshita | G06T 7/60 |
| 11,830,165 | B2 * | 11/2023 | Park | G06T 7/215 |
| 2009/0147359 | A1 * | 6/2009 | Wada | G02B 5/3025 |
| | | | | 264/1.34 |
| 2013/0299696 | A1 * | 11/2013 | Yamazaki | H01J 37/26 |
| | | | | 250/311 |
| 2015/0116477 | A1 * | 4/2015 | Kang | G02B 21/06 |
| | | | | 348/79 |
| 2017/0205291 | A1 * | 7/2017 | Shimada | G01J 9/00 |
| 2022/0236549 | A1 * | 7/2022 | Bartels | G01N 21/6458 |
| 2022/0269061 | A1 * | 8/2022 | Sekiya | G02B 21/06 |
| 2023/0314327 | A1 * | 10/2023 | Hoffman | G01N 21/6428 |
| 2026/0012711 | A1 * | 1/2026 | Sato | H04N 23/95 |

FOREIGN PATENT DOCUMENTS

| | | |
|---|---|---|
| KR | 10-2017-0000647 A | 1/2017 |
| KR | 101798219 B1 | 11/2017 |

OTHER PUBLICATIONS

Nadya Chakrova, Rainer Heintzmann, Bernd Rieger, and Sjoerd Stallinga, "Studying different illumination patterns for resolution improvement in fluorescence microscopy," Opt. Express 23, 31367-31383 (2015) (Year: 2015).*
International Search Report, Jan. 18, 2023.
UNIST. Aug. 19, 2020, Yang, Yun Jeong. Evolution of Optical Microscope . . . Two Results Can Be Seen at the Same Time from One Observation).
Woo, Taeseong et al. Tunable SIM: observation at varying spatiotemporal resolutions across the FOV. Optica. vol. 7, No. 8, pp. 973-980, Aug. 10, 2020.
Notice of Allowance in Korean Application No. 10-2021-0136698 issued on Jul. 29, 2024.

* cited by examiner

OBJECT UNDER OBSERVATION

PATTERN ILLUMINATION

INVERSE APPLICATION OF PATTERN (a)

(b)

(c)

20

20

APPARATUS AND METHOD FOR IMAGE ACQUISITION BASED ON ENHANCEMENT OF MAXIMUM CONTRAST RATIO AND STORAGE MEDIUM STORING INSTRUCTIONS TO PERFORM METHOD FOR IMAGE ACQUISITION

TECHNICAL FIELD

The present disclosure relates to an apparatus, a method, a computer-readable recording medium, and a computer program for obtaining a maximum contrast ratio enhanced image.

BACKGROUND

Wide-angle imaging techniques are used in various fields such as fluorescence bio-imaging and machine vision. When capturing a typical wide-angle image, the image is acquired using a camera; at this time, the maximum contrast ratio that may be obtained in one image is determined according to the hardware characteristics of the camera. In other words, the ratio of the weakest to the strongest visual signals that may be obtained is determined according to the hardware characteristics of the camera.

Due to the limitation in the maximum contrast ratio, a single image alone is not sufficient to perform a quantitative evaluation on all visual information of a specific object under observation of interest. For example, if the exposure time is extended or intensity of incident light is increased to capture a weak visual signal during the image capture, intensity of a visual signal may exceed a signal acquisition range in the area already with a strong visual signal, resulting in color saturation. On the other hand, if the exposure time is shortened or intensity of incident light is reduced to capture a strong visual signal, intensity of a weak visual signal at another area of the field of view is now measured below the signal acquisition range, and the weak visual signal may be hidden below the noise floor.

SUMMARY

In view of the above, the present disclosure provides an image acquisition method preserving all the original visual information from one image regardless of the maximum contrast ratio limited by the hardware limitations of a camera. An embodiment of the present disclosure provides a method that captures signals even below the noise level and within the color saturation range by spatially controlling the patterns of incident light so that the range of the original visual information distributed across an object under observation falls within a predetermined range and restores the original visual information by inversely applying the pattern information of the incident light.

The aspects of the present disclosure are not limited to the foregoing, and other aspects not mentioned herein will be clearly understood by those skilled in the art from the following description.

In accordance with an aspect of the present disclosure, there is provided an image acquisition apparatus, the device comprises: a memory configured to store one or more instructions; and a processor configured to execute the one or more instructions stored in the memory, wherein the instructions, when executed by the processor, cause the processor to: obtain distribution information representing distribution of an original visual information of at least one region of interest including an object under observation;

determine an illumination pattern of a light source based on the distribution information so that a range of the original visual information of at least one region of interest including the object under observation falls within a pre-determined range; control the light source to illuminate the determined illumination pattern on an object under observation; obtain images of an object under observation illuminated by the light source with the determined illumination pattern; and estimate the original visual information for at least one region of interest including an object under observation by tracking back information on the obtained images based on the information on the illumination pattern.

Additionally, the processor may be configured to determine a first region of interest including visual information with intensity less than the pre-determined range within at least one region of interest including an object under observation, a second region of interest including visual information within the pre-determined range within at least one region of interest including an object under observation, and a third region of interest including visual information with intensity greater than the pre-determined range within at least one region of interest including an object under observation.

Additionally, the processor may be configured to determine an intensity of light illuminated onto the first region of interest to be a times (where a is a real number such that $a>1$) of an intensity of light directed onto the second region of interest so that the light illuminated onto the first region of interest becomes stronger than the light illuminated onto the second region of interest, and determine an intensity of light illuminated onto the third region of interest to be b times (where b is a real number such that $0<b<1$) of the intensity of light illuminated onto the second region of interest so that the light amplitude onto the third region of interest becomes weaker than the light amplitude onto the second region of interest.

Additionally, the processor may be configured to determine the original visual information of the object under observation by dividing the information on the obtained images of the object under observation by a value from multiplication of the illumination pattern of the light source on each region of interest and a point spread function for each image region obtained from the first region of interest, second region of interest, and third region of interest.

Additionally, the original visual information may include at least one of brightness information, RGB information, contrast information, saturation information, and gray scale information.

In accordance with another aspect of the present disclosure, there is provided an image acquisition method, the method comprises: obtaining distribution information representing distribution of an original visual information of at least one region of interest including an object under observation; determining an illumination pattern of a light source based on the distribution information so that a range of the original visual information of at least one region of interest including the object under observation falls within a pre-determined range; controlling the light source to illuminate the determined illumination pattern on the object under observation; obtaining images of the object under observation illuminated by the light source with the determined illumination pattern; and estimating the original visual information for at least one region of interest including the object under observation by tracking back information on the obtained images based on the information on the illumination pattern.

Additionally, obtaining the distribution information may include determining a first region of interest including visual information with intensity less than the pre-determined range within at least one region of interest including an object under observation, a second region of interest including visual information within the pre-determined range within at least one region of interest including the object under observation, and a third region of interest including visual information with intensity greater than the pre-determined range within at least one region of interest including the object under observation.

Additionally, the process of determining the illumination pattern of the light source may include determining an intensity of light illuminated onto the first region of interest to be a times (where a is a real number such that a>1) of an intensity of light directed onto the second region of interest so that the light illuminated onto the first region of interest becomes stronger than the light illuminated onto the second region of interest, and determining an intensity of light illuminated onto the third region of interest to be b times (where b is a real number such that 0<b<1) of the intensity of light illuminated onto the second region of interest so that the light intensity onto the third region of interest becomes weaker than the light intensity onto the second region of interest.

Additionally, the process of estimating the original visual information may include determining the original visual information of the object under observation by dividing the information on the obtained images of the object under observation by a value corresponding to the relative illumination pattern intensities of the light source on each region of interest and a point spread function for each image region obtained from the respective regions of interest.

Additionally, the original visual information may include at least one of brightness information, RGB information, contrast information, saturation information, and gray scale information.

In accordance with another aspect of the present disclosure, there is provided a non-transitory computer readable storage medium storing computer executable instructions, wherein the instructions, when executed by a processor, cause the processor to perform an image acquisition method, the method comprises: obtaining distribution information representing distribution of an original visual information of at least one region of interest including an object under observation; determining an illumination pattern of a light source based on the distribution information so that a range of the original visual information of at least one region of interest including the object under observation falls within a pre-determined range; controlling the light source to illuminate the determined illumination pattern on the object under observation; obtaining images of the object under observation illuminated by the light source with the determined illumination pattern; and estimating the original visual information for at least one region of interest including the object under observation by tracking back information on the obtained images based on the information of the illumination pattern.

In accordance with another aspect of the present disclosure, there is provided computer program including computer executable instructions stored in a non-transitory computer readable storage medium, wherein the instructions, when executed by a processor, cause the processor to perform an image acquisition method, the method comprises: obtaining distribution information representing distribution of an original visual information of at least one region of interest including an object under observation;

4 determining an illumination pattern of a light source based on the distribution information so that a range of the original visual information of at least one region of interest including the object under observation falls within a pre-determined range; controlling the light source to illuminate the determined illumination pattern on the object under observation; obtaining images of the object under observation illuminated by the light source with the determined illumination pattern; and estimating the original visual information for at least one region of interest including the object under observation by tracking back information on the obtained images based on the information of the illumination pattern.

An embodiment of the present disclosure enables simultaneous measurement of a weak signal below the noise level of a camera and a strong signal causing color saturation due to the limitation of pixels within one image. Accordingly, if the embodiment of the present disclosure is applied to bio-imaging, high-resolution large-area images may be obtained, including images capturing structural connectivity of synapses across the entire brain or mitochondria distributed in each area of nerve cells.

The technical objects of the present disclosure are not limited to those described above, and other technical objects not mentioned above may be understood clearly by those skilled in the art from the descriptions given below.

DETAILED DESCRIPTION

Figure 1:
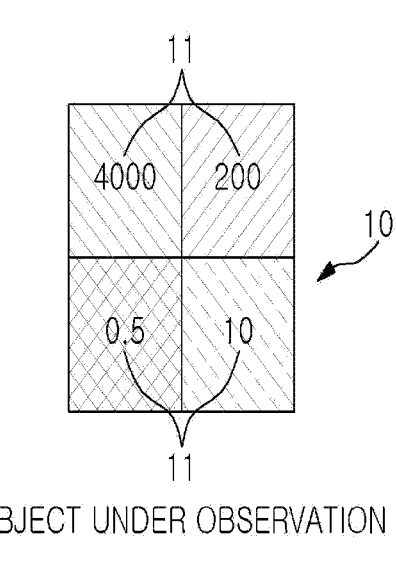
FIG. 1 illustrates the basic operation of obtaining visual information of an object under observation.
Figure 1:
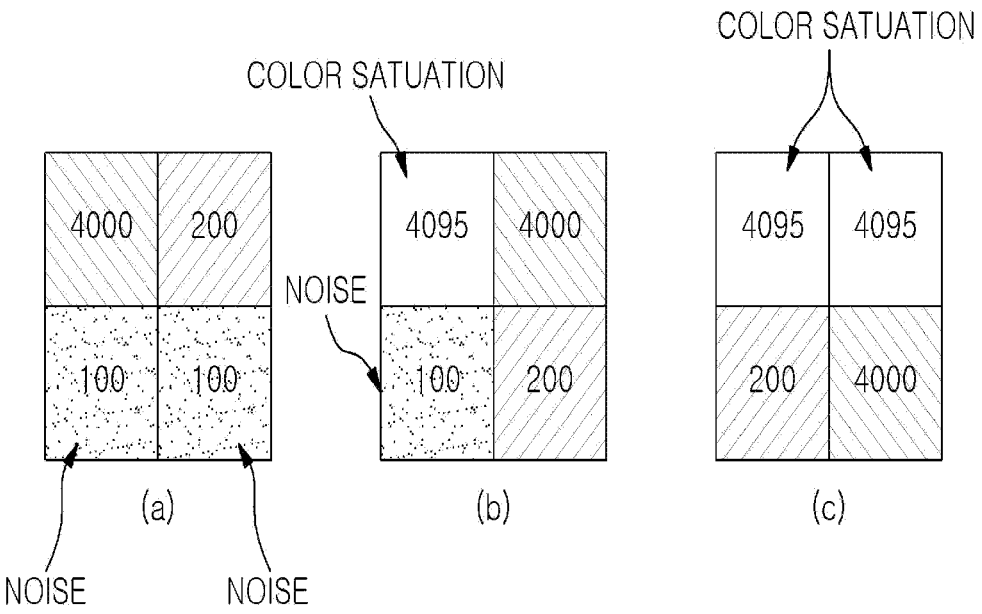

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

FIG. 1 illustrates the basic operation of obtaining visual information of an object under observation.

Referring to FIG. 1, an object under observation, which is an object to be observed, is an entity governed by natural laws; therefore, the object under observation may include inherent visual information obtained without specific limitations. However, during the process of extracting visual information of an object under observation through an imaging device such as a camera or a microscope, the range of obtained visual information may be limited due to the hardware specifications of the imaging device.

For example, suppose FIGS. 1(*a*), (*b*), and (*c*) represent the visual information obtained by varying incident light to obtain the original visual information 11 included in the object under observation 10 of FIG. 1. Here, the numbers written on the object under observation 10 of FIG. 1 represent the distribution of the original visual information 11 included in the object under observation, and the numbers written on FIGS. 1(*a*), (*b*), and (*c*) represent the visual information obtained as the intensity of incident light progressively increases from (a) to (c).

If it is assumed that the range of visual information (e.g. visual information such as light intensity, light wavelength, pixel value, and light contrast value) that may be obtained through an imaging device is between 200 and 4095, the case of (a) reveals a problem that there is an area where the visual signal is 100, and a portion of the object under observation 10 is recognized as noise, and the original visual information may not be obtained. In the case of (b), where incident light is stronger than the case of (a), the area recognized as noise is reduced, but color saturation appears in some areas. In the case of (c), where incident light is even stronger than the case of (b), all parts previously recognized as noise disappear, but the portion exhibiting color saturation significantly increases.

As described above, due to the physical limitations of visual information that may be obtained by an imaging device, existing methods that control intensity or exposure time of incident light inadvertently generate noise or color saturation areas, making normal observation difficult. The purpose the embodiment of the present disclosure is to obtain the original visual information of all parts of the object under observation simultaneously by utilizing the concept of FIG. 2.

Figure 2:
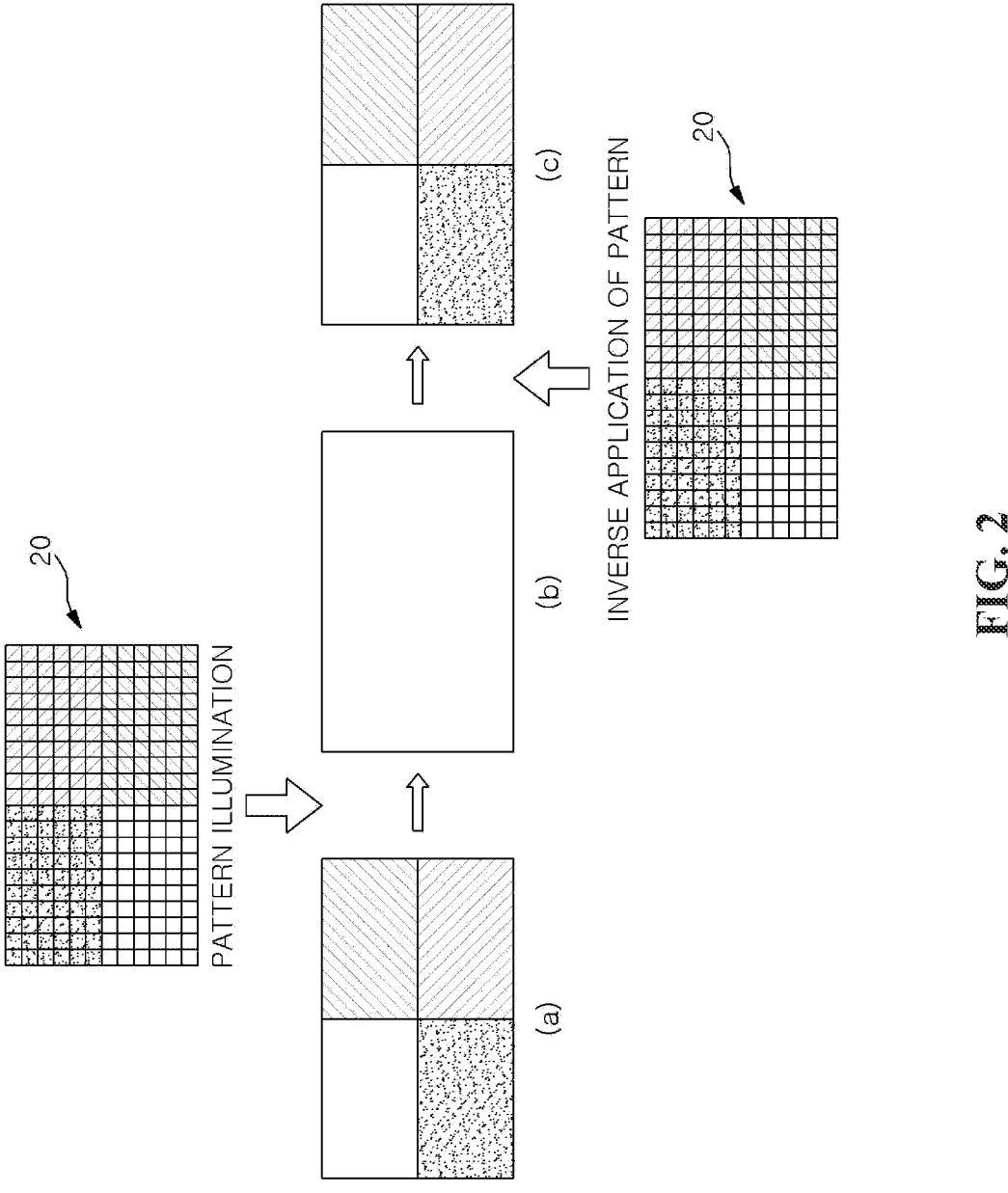
FIG. 2 is a conceptual drawing illustrating the operation of obtaining visual information of an object under observation by applying a pattern to incident light according to one embodiment of the present disclosure.

FIG. 2 is a conceptual drawing illustrating the operation of obtaining visual information of an object under observation by applying a pattern to incident light according to one embodiment of the present disclosure.

Referring to FIG. 2, according to one embodiment of the present disclosure, after distribution information of the original visual information included in the object under observation (a) is obtained, a light source with a pattern 20 that narrows the dynamic range of the visual information measured from the object under observation may be directed on the object under observation. Accordingly, visual information (b) with a reduced dynamic range in its measured values may be obtained. Afterwards, the original visual information (c) of the object under observation may be inferred by inversely applying the information on the pattern 20 of the incident light source.

In what follows, together with FIGS. 3 to 5, a method will be described in detail, which spatially controls the pattern of incident light that confines the range of the original visual information distributed across an object under observation to be within a predetermined range, obtain all of signals ranging from below the noise level up to the point of color saturation, inversely applies the information on the pattern of incident light, and infers the original visual information included in the object under observation.

Figure 3:
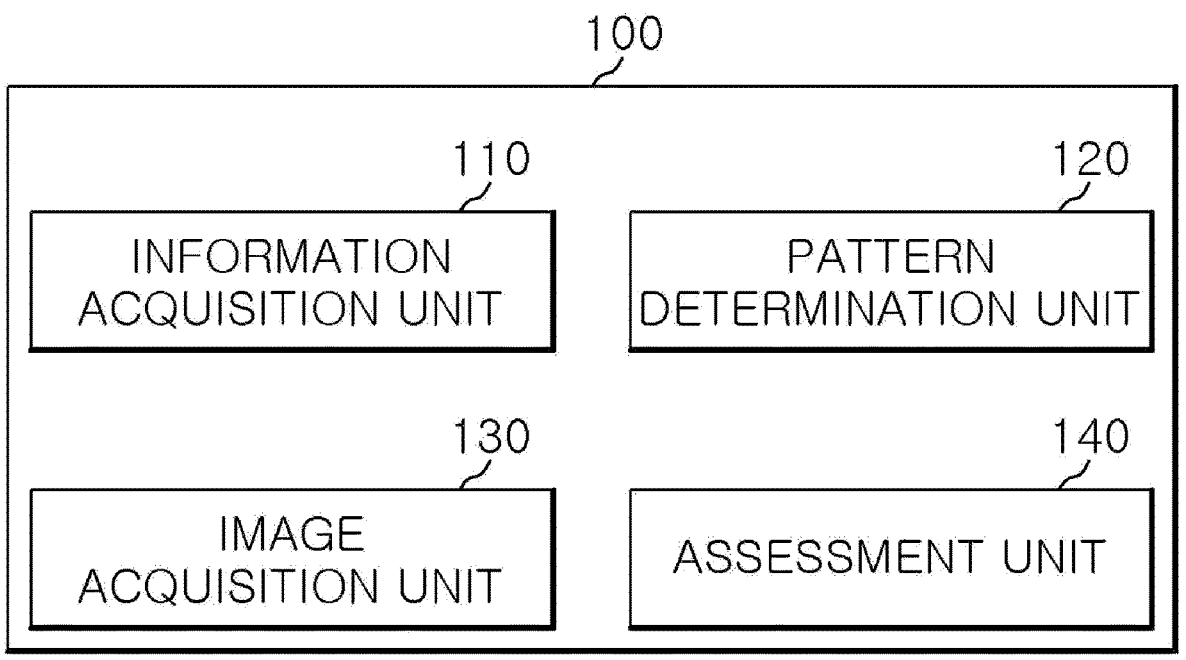
FIG. 3 is a functional block diagram of an apparatus for obtaining an image according to one embodiment of the present disclosure.

FIG. 3 is a functional block diagram of an apparatus 100 for obtaining a maximum contrast-ratio enhanced image (in what follows, it is referred to as an 'image acquisition apparatus 100') according to one embodiment of the present disclosure. The overall operation of the image acquisition apparatus 100 according to one embodiment of the present disclosure may be performed by one or more processors, and the one or more processors may control the functional blocks included in FIG. 3 to perform operations to be described later.

Referring to FIG. 3, an image acquisition apparatus 100 according to one embodiment of the present disclosure may comprise an information acquisition unit 110, a pattern determination unit 120, an image acquisition unit 130, and an assessment unit 140.

The information acquisition unit 110 may acquire distribution information of the original visual information included in an object under observation. The original visual information refers to the information according to a predetermined specification used to obtain unique visual information of the object. For example, the original visual information may include values measured from the object according to measurement specifications, such as brightness information, RGB information, contrast information, saturation information, and gray scale information.

For example, the information acquisition unit 110 may determine a first region of interest in which the values measured from the object under observation contain visual information with intensity less than a pre-determined range, a second region of interest which includes visual information within the pre-determined range, and a third region of interest which includes visual information with intensity exceeding the pre-determined range and generate distribution information of the object under observation. At this time, the pre-determined range may be determined based on the hardware specifications of the imaging device (e.g., a camera or a microscope) that obtains numerical values according to the measurement specification from the object under observation. For example, if the imaging device has specifications with a luminance measurement range between 200 cd and 4095 cd, distribution information may be generated, which designates areas of the object under observation into three region of interest: a first region of interest in which measurements are read as noise, a second region of interest in which luminance is measured between 200 cd and 4095 cd, and a third region of interest in which color saturation appears.

According to the classification into the three areas described above, the visual signal included in the object under observation may be expressed by Eq. 1 below.

$$O(\vec{r}) = O(\vec{r_1}) + O(\vec{r_2}) + O(\vec{r_3}) \qquad \text{[Eq. 1]}$$

In Eq. 1, $\vec{r}$ represents the position coordinates of the object under observation, $O(\vec{r})$ represents the original visual information of the object under observation, $O(\vec{r_1})$ represents the original visual information of the first region of interest, $O(\vec{r_2})$ represents the original visual information of the second region of interest, and $O(\vec{r_3})$ represents the original visual information of the third region of interest.

Here, since accurate values of the original visual information of the first region of interest $O(\vec{r_1})$ and the original visual information of the third region of interest $O(\vec{r_3})$ may not be directly measured due to the limitations of the physical specifications of the imaging device, a pattern of an incident light source, which makes the range of the original visual information distributed across the object under observation fall within a pre-determined range, may be spatially controlled as follows.

The pattern determination unit 120 may determine the pattern of a light source incident on the object under observation based on the distributed information so that the distribution range of the original visual information falls within the pre-determined range, and the image acquisition unit 130 may obtain an image by directing the light source with a determined pattern on the object under observation.

For example, the pattern determination unit 120 may determine the pattern of the light source, which directs a light source with intensity stronger than that in the second region of interest onto the first region of interest of the object under observation and directs a light source with intensity weaker than that in the second region of interest onto the third region of interest of the object under observation. The image acquisition unit 130 may direct a light source with a determined pattern on the object under observation and obtain visual information lying within the pre-determined range across the entire area of the object under observation.

The visual information obtained from illumination of the light source with a pattern may be expressed by Eq. 2 below.

$$I_{SI}(\vec{r}) = \left[ O(\vec{r}) \cdot P(\vec{r}) \right] * PSF \qquad \text{[Eq. 2]}$$
$$= \left[ O(\vec{r_1}) \cdot \alpha(\vec{r_1}) \cdot P + O(\vec{r_2}) \cdot P + O(\vec{r_3}) \cdot \beta(\vec{r_3}) \cdot P \right] * PSF$$

In Eq. 2, $I_{SI}(\vec{r})$ represents the visual information in the image obtained, $\vec{r}$ represents the position coordinates of the observation target, $O(\vec{r})$ represents the observation target, $P(\vec{r})$ represents the information on the pattern of a light source, PSF represents a point spread function which defines the degree of dispersion of the light source emanating from a specific point, $O(\vec{r_1})$ represents the original visual information of the first region of interest, $O(\vec{r_2})$ represents the original visual information of the second region of interest, $O(\vec{r_3})$ represents the original visual information of the third region of interest, P represents the intensity of the light source directed onto the second region of interest, $\alpha(\vec{r_1})$ represents an intensity coefficient of a light source directed onto the first region of interest and with higher intensity compared to the second region of interest, where the intensity coefficient is a real number greater than 1, and $\beta(\vec{r_3})$ represents an intensity coefficient of a light source directed onto the third region of interest and with weaker intensity compared to the second region of interest, where the intensity coefficient is a real number greater than 0 and less than 1.

The assessment unit 140 may track back the obtained images based on the information on the pattern and obtain the original visual information of the object under observation. For example, the assessment unit 140 may assess the original visual information of the object under observation by dividing the obtained image information by the value obtained from multiplication of an illumination pattern of the light source on each region of interest and the point spread function for each image area obtained from the first region of interest, second region of interest, and third region of interest.

The process of tracking back the original visual information may be expressed by Eq. 3 below.

$$O(\vec{r}) = \frac{I_{HDR}(\vec{r_1})}{\left[ \alpha(\vec{r_1}) \cdot P \right] * PSF} + \frac{I_{HDR}(\vec{r_2})}{P * PSF} + \frac{I_{HDR}(\vec{r_3})}{\left[ \beta(\vec{r_3}) \cdot P \right] * PSF} \qquad \text{[Eq. 3]}$$

In Eq. 3, $O(\vec{r})$ represents the original visual information of the observation target, $\vec{r}$ represents the position coordinates of the observation target, $I_{HDR}(\vec{r_1})$ represents the visual information measured from the first region of interest, $I_{HDR}(\vec{r_2})$ represent the visual information measured from the second region of interest, $I_{HDR}(\vec{r_3})$ represents the visual information measured from the third region of interest, P represents the intensity of a light source illuminated on the second region of interest, $\alpha(\vec{r_1})$ represents an intensity coefficient of a light source directed onto the first region of interest and with enhanced intensity compared to the second region of interest, where the intensity coefficient is a real number greater than 1, $\beta(\vec{r_3})$ represents an intensity coefficient of a light source directed onto the third area and with weaker intensity compared to the second region of interest, where the intensity coefficient is a real number greater than 0 and less than 1, and PSF represents the point spread function which defines the degree of dispersion of the light source emanating from a specific point.

Figure 4:
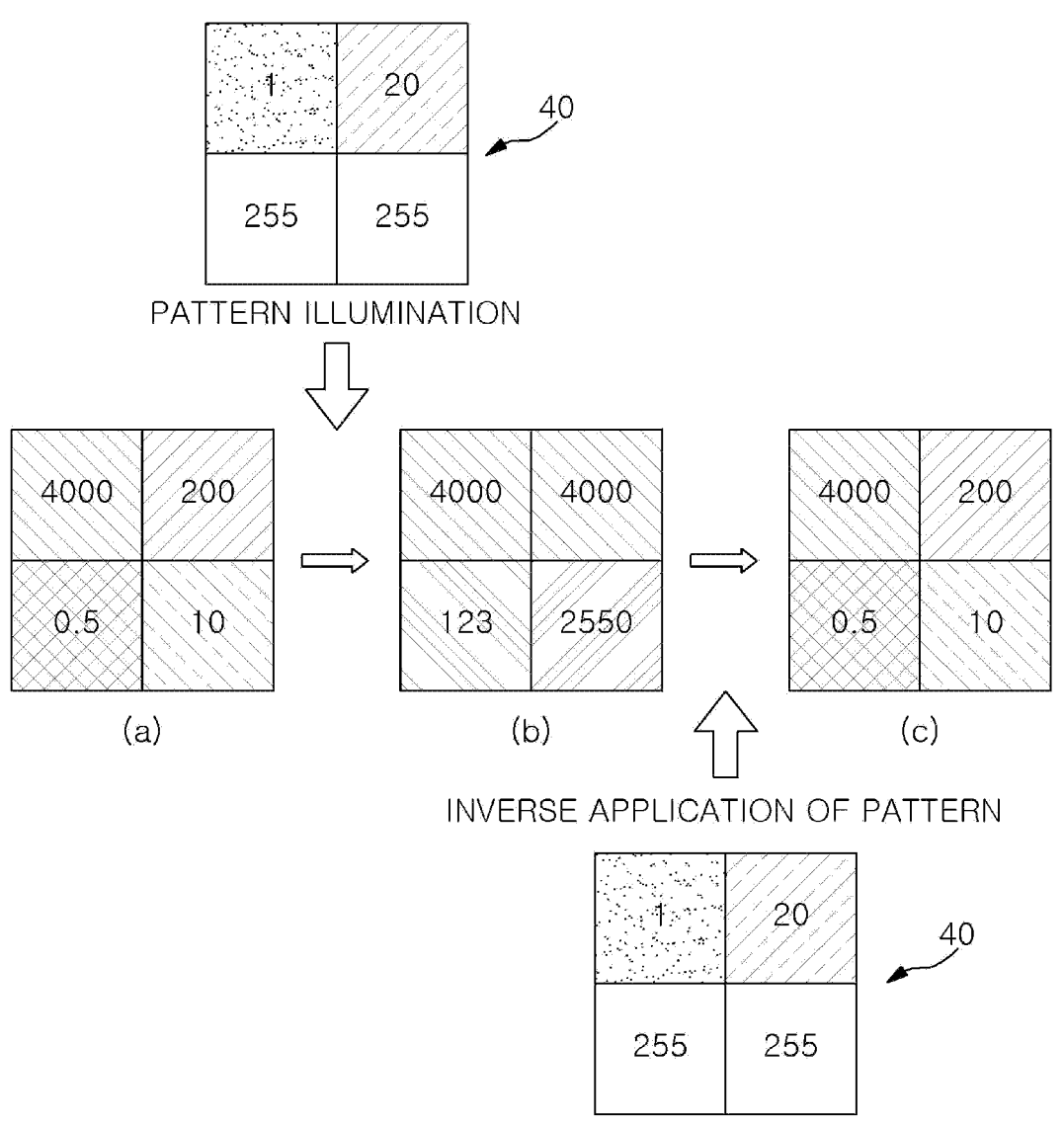
FIG. 4 illustrates the operation of obtaining visual information of an object under observation by applying a pattern to incident light according to one embodiment of the present disclosure.

In other words, the process expressed with reference to Eqs. 1 to 3 may be described using another example, as shown in FIG. 4.

FIG. 4 illustrates the operation of obtaining visual information of an object under observation by applying a pattern to incident light according to one embodiment of the present disclosure.

Referring to FIG. 4, the object under observation (a) may include the original visual information different for each area. At this time, if the value of the visual information physically measurable by the imaging device is greater than or equal to 100 and less than or equal to 4000, the embodiment of the present disclosure may direct the light source with a pattern 40, which controls the value of the visual information measured across the entire area of the object under observation to be measured between 100 and 4000, on the object under observation. Accordingly, visual information (b) derived by multiplication of the original visual information included in each area with the intensity of the pattern 40 may be obtained. Since the information on the pattern applied to the light source is known in the embodiment of the present disclosure, the original visual information of the object under observation may be inferred by dividing the measured visual information by the intensity of the pattern 40.

Although, three different regions of interest with varying illumination intensities have been exemplified in the embodiments of the present invention, it is not limited thereto, and the present invention can be variously modified.

Figure 5:
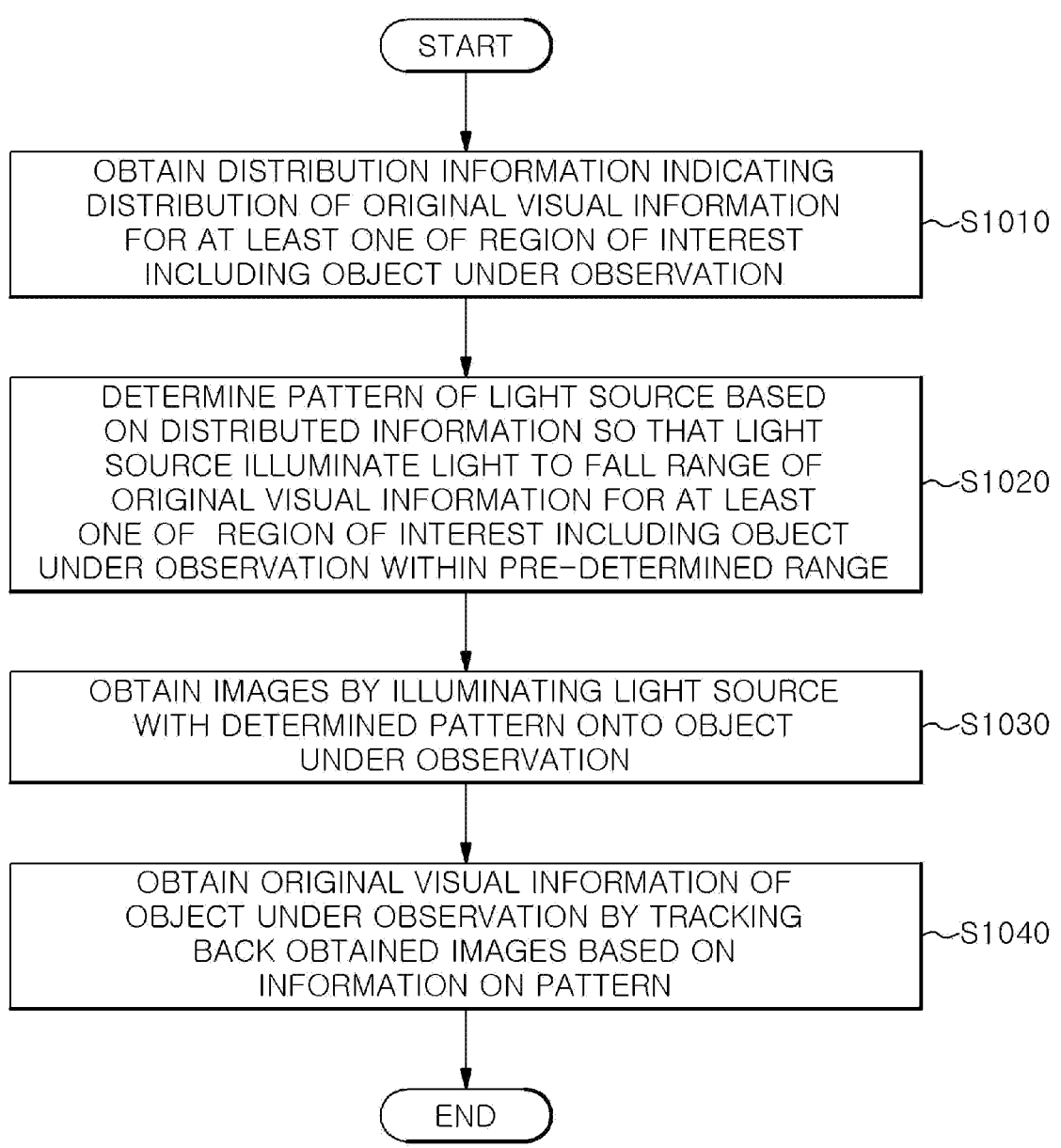
FIG. 5 is a flow diagram illustrating an image acquisition method according to one embodiment of the present disclosure.

FIG. 5 is a flow diagram illustrating an image acquisition method according to one embodiment of the present disclosure. Individual steps of the image acquisition method according to FIG. 5 may be performed by the image acquisition apparatus 100 described with reference to FIG. 3, and the respective steps may be described as follows.

In the S1010 step, the image acquisition unit 110 may obtain the distribution information of the original visual information included in the object under observation.

In the S1020 step, the pattern determination unit 120 may determine the pattern of a light source incident on the object under observation based on the distributed information of the original visual information so that the range of the original visual information distributed on the object under observation falls within a pre-determined range.

In the S1030 step, the image acquisition unit 130 may obtain an image by directing the light source with a determined pattern on the object under observation.

In the S1040 step, the assessment unit 140 may track back the obtained images based on the information on the pattern and obtain the original visual information of the object under observation.

Meanwhile, in addition to the steps shown in FIG. 5, as the information acquisition unit 110, the pattern determination unit 120, the image acquisition unit 130, and the assessment unit 140 compose the embodiments that perform the operations described with reference to FIG. 3 in various ways, new steps performed by the respective function blocks may also be added to the steps of FIG. 5; since the configuration of additional steps and the operations of the constituting elements which are the subjects of the respective steps to perform the corresponding steps have been described, repeated descriptions will be omitted.

In the embodiment of the present disclosure, the information acquisition unit 110, the pattern determination unit 120, the image acquisition unit 130, and the assessment unit 140 may be implemented by a hardware apparatus such as a processor. In another example, embodiments of the present disclosure may be implemented by hardware, firmware, software, or a combination thereof.

In the case of hardware implementation, the method according to embodiments of the present disclosure may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, and microprocessors.

In the case of implementation by firmware or software, the method according to the embodiments of the present disclosure may be implemented in the form of modules, procedures, or functions which perform the functions or operations described above. Software codes may be stored in a memory unit and activated by the processor. The memory unit may be located inside or outside of the processor and may exchange data with the processor by using various well-known means.

An embodiment of the present disclosure enables simultaneous measurement of a weak signal below the noise level of a camera and a strong signal causing color saturation due to the limitation of pixels within one image. Accordingly, if the embodiment of the present disclosure is applied to bio-imaging, high-resolution large-area images may be obtained, including images capturing structural connectivity of synapses across the entire brain or mitochondria distributed in each area of nerve cells.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. An image acquisition apparatus comprising:
   a memory configured to store one or more instructions; and
   a processor configured to execute the one or more instructions stored in the memory, wherein the instructions, when executed by the processor, cause the processor to:
   obtain distribution information representing distribution of an original visual information of at least one region of interest including an object under observation;
   determine an illumination pattern of a light source based on the distribution information so that a range of the original visual information of at least one region of interest including the object under observation falls within a pre-determined range;
   control the light source to illuminate the determined illumination pattern on the object under observation;
   obtain images of the object under observation illuminated by the light source with the determined illumination pattern; and
   estimate the original visual information for at least one region of interest including the object under observation by tracking back information on the obtained images based on the information on the illumination pattern.

2. The image acquisition apparatus of claim 1, wherein the processor is configured to determine a first region of interest including visual information with intensity less than the pre-determined range within at least one region of interest including the object under observation, a second region of interest including visual information within the pre-determined range within at least one region of interest including the object under observation, and a third region of interest including visual information with intensity greater than the pre-determined range within at least one region of interest including the object under observation.

3. The image acquisition apparatus of claim 2, wherein the processor is configured to determine an intensity of light illuminated onto the first region of interest to be a times (where a is a real number such that a>1) of an intensity of light directed onto the second region of interest so that the light illuminated onto the first region of interest becomes stronger than the light illuminated onto the second region of interest, and determine an intensity of light illuminated onto the third region of interest to be b times (where b is a real number such that 0<b<1) of the intensity of light illuminated onto the second region of interest so that the light intensity onto the third region of interest becomes weaker than the light intensity onto the second region of interest.

4. The image acquisition apparatus of claim 3, wherein the processor is configured to determine the original visual information of the object under observation by dividing the information on the obtained images of the object under observation by a value from multiplication of the illumination pattern of the light source on each region of interest and a point spread function for each image region obtained from the first region of interest, second region of interest, and third region of interest.

5. The image acquisition apparatus of claim 1, wherein the original visual information includes at least one of brightness information, RGB information, contrast information, saturation information, and gray scale information.

6. An image acquisition method to be performed by an image acquisition apparatus including a memory and a processor, the method comprising:
   obtaining distribution information representing distribution of an original visual information of at least one region of interest including an object under observation;
   determining an illumination pattern of a light source based on the distribution information so that a range of the original visual information of at least one region of interest including the object under observation falls within a pre-determined range;
   controlling the light source to illuminate the determined illumination pattern on the object under observation;
   obtaining images of the object under observation illuminated by the light source with the determined illumination pattern; and
   estimating the original visual information for at least one region of interest including the object under observation by tracking back information on the obtained images based on the information on the illumination pattern.

7. The image acquisition method of claim 6, wherein the obtaining distribution information includes determining a first region of interest including visual information with intensity less than the pre-determined range within at least one region of interest including the object under observation, a second region of interest including visual information within the pre-determined range within at least one region of interest including the object under observation, and a third region of interest including visual information with intensity greater than the pre-determined range within at least one region of interest including the object under observation.

8. The image acquisition method of claim 7, wherein the determining the illumination pattern of the light source includes:
   determining an intensity of light illuminated onto the first region of interest to be a times (where a is a real number such that a>1) of an intensity of light directed onto the second region of interest so that the light illuminated onto the first region of interest becomes stronger than the light illuminated onto the second region of interest, and
   determining an intensity of light illuminated onto the third region of interest to be b times (where b is a real number such that 0<b<1) of the intensity of light illuminated onto the second region of interest so that the light intensity onto the third region of interest becomes weaker than the light intensity onto the second region of interest.

9. The image acquisition method of claim 8, wherein the estimating the original visual information includes determining the original visual information of the object under observation by dividing the information on the obtained images of the object under observation by a value from multiplication of the illumination pattern of the light source on each region of interest and a point spread function for each image region obtained from the first region of interest, second region of interest, and third region of interest.

10. The image acquisition method of claim 6, wherein the original visual information includes at least one of brightness information, RGB information, contrast information, saturation information, and gray scale information.

11. A non-transitory computer readable storage medium storing computer executable instructions, wherein the instructions, when executed by a processor, cause the processor to perform an image acquisition method, the method comprising:

obtaining distribution information representing distribution of an original visual information of at least one region of interest including an object under observation;

determining an illumination pattern of a light source based on the distribution information so that a range of the original visual information of at least one region of interest including the object under observation falls within a pre-determined range;

controlling the light source to illuminate the determined illumination pattern on the object under observation;

obtaining images of the object under observation illuminated by the light source with the determined illumination pattern; and estimating the original visual information for at least one region of interest including the object under observation by tracking back information on the obtained images based on the information on the illumination pattern.

\*    \*    \*    \*    \*